United States Patent

Kalfs et al.

[11] Patent Number: 6,061,196
[45] Date of Patent: *May 9, 2000

[54] SYSTEM FOR RECORDING AND/OR REPRODUCING INFORMATION MEDIUM FOR USE IN THE SYSTEM, AND MAGNETIC WRITE HEAD AND ARRANGEMENT FOR FORMATTING THE MEDIUM

[75] Inventors: Johannes J. W. Kalfs; Abraham Hoogendoorn, both of Eindhoven, Netherlands

[73] Assignee: OnStream, Inc., Loveland, Colo.

[*] Notice: This patent is subject to a terminal disclaimer.

[21] Appl. No.: 08/972,976

[22] Filed: Nov. 19, 1997

Related U.S. Application Data

[63] Continuation-in-part of application No. 08/886,995, Jun. 2, 1997, Pat. No. 5,912,778.

[30] Foreign Application Priority Data

Dec. 10, 1996 [EP] European Pat. Off. .............. 96203490

[51] Int. Cl.$^7$ ....................................................... G11B 5/09
[52] U.S. Cl. ....................... 360/48; 360/77.12; 360/78.02
[58] Field of Search ................................... 360/48, 77.12, 360/78.02

[56] References Cited

U.S. PATENT DOCUMENTS 5,426,543  6/1995  Dy et al. .............................. 360/77.12
5,912,778  6/1999  Kalfs et al. .............................. 360/48

Primary Examiner—Andrew L. Sniezek
Attorney, Agent, or Firm—Welsh & Katz, Ltd.

[57] ABSTRACT

The invention relates to a comprising a magnetic tape formatted by a write head, and an apparatus comprising a magnetic head unit which is movable on a transverse direction by an actuator. The write head records the magnetic tape with a pattern of servotracks ST101–ST127 which extend in a longitudinal direction. The odd-numbered servotracks contain a first servosignal and the even-numbered servotracks contain a second servosignal Sb which is phase opposition to the first servosignal. The servotracks ST103–ST113 and ST116–ST126 have a typical width W1 and form a group of two bands of N1 servotracks which are separated by a band of N2 servotracks ST114, ST115 having a typical width W2. The magnetic tape is adapted to cooperate with an apparatus comprising eight magnetic write heads. The actuator is controlled in response to the servosignals read by the heads. The center-to-center distance between the magnetic write heads is equal to four times the typical width W1 and, moreover, it holds that:

N2=2, 4, 6 etc. and W2=(k+½)W1
or N2=1, 3, 5 etc. and W2=2k.W1,
where k=1, 2 etc.

18 Claims, 6 Drawing Sheets

SYSTEM FOR RECORDING AND/OR REPRODUCING INFORMATION MEDIUM FOR USE IN THE SYSTEM, AND MAGNETIC WRITE HEAD AND ARRANGEMENT FOR FORMATTING THE MEDIUM

This is a continuation-in-part of application Ser. No. 08/886,995, filed Jun. 2, 1997 now U.S. Pat. No. 5,912,778.

BACKGROUND OF THE INVENTION

1. Field of the Invention

The invention relates to a system for recording and/or reproducing information, comprising a magnetizable medium provided with a track pattern comprising buried servotracks of a first type containing a first signal, and buried servotracks of a second type containing a second signal, which servotracks extend substantially in a longitudinal direction and which track pattern, in a transverse direction perpendicular to the longitudinal direction, alternately comprises a servotrack of the first type followed by a servotrack of the second type, and an apparatus comprising a magnetic head unit comprising a plurality of heads at different positions in the transverse direction, means for moving the medium relative to the magnetic head unit in the longitudinal direction, an actuator for moving the magnetic head unit relative to the medium in the transverse direction, and a control unit for controlling the actuator, which control unit is adapted to generate a position signal based on the difference between the signals of two heads.

The invention also relates to a medium for such a system.

The invention further relates to a magnetic write head comprising a head face with a longitudinal direction in which a magnetizable medium is movable relative to the magnetic write head, and a transverse direction oriented transversely to the longitudinal direction, and further comprising a structure of integrated write units, which structure terminates in the head face, which write units are disposed adjacent one another in the transverse direction, extend substantially in the transverse direction and each have a write gap.

The invention also relates to an arrangement comprising such a magnetic write head and means for scanning a magnetizable medium with the head.

2. Description of Related Art

Such a medium, such a system and such a magnetic write head are known from WO 96/30897-A2. The known medium is a magnetic tape on which seven servotracks have been written by means of the known magnetic write head, the signal in the first servotrack being in phase with the signal in the third, the fifth and the seventh servotrack and the signals in the second, the fourth and the sixth servotrack being in phase opposition to the signals in the first, the third and the fifth servotrack. By means of an apparatus forming part of the known system it is possible to write information signals over the servotracks on the magnetic tape thus formatted. For this purpose, the apparatus comprises a magnetic head unit having four heads and means for moving the magnetic tape past the magnetic head unit in a longitudinal direction. The known apparatus further comprises an actuator for positioning the magnetic head unit in a transverse direction and a control unit for controlling the actuator.

The control circuit comprises a comparator for generating a position signal based on the difference between the signal supplied by a first head and the signal supplied by a second head. The magnetic head unit follows the servotracks on the magnetic tape on the basis of the position signal. A disadvantage of the known system, the known medium and the known magnetic write head is that after the whole magnetic tape has been written or read the magnetic tape is to be rewound in order to return it into its initial position. Another disadvantage of the known system is that only one half of the number of heads supplies information about the position of the servotracks relative to the magnetic head unit.

SUMMARY OF THE INVENTION

It is an object of the invention to provide a system, a medium, a magnetic write head and an arrangement of the types defined in the opening paragraphs, by means of which it is possible to achieve a high accuracy of positioning the magnetic head unit relative to the track pattern on the medium and by means of which it is possible to read and/or write the information from/on the track pattern in an even number of passes. To this end, the system in accordance with the invention is characterized in that the track pattern comprises a group of at least two bands of a first type separated by a band of a second type, which bands of the first type adjoin a servotrack at their sides remote from the band of the second type, the bands of the first type comprising N1 servotracks having a first typical width W1, the bands of the second type comprising N2 servotracks having a second typical width W2, which complies with N2=2, 4, 6 etc. and W2=(k+½)W1 or N2=1, 3, 5 etc. and W2=2k.W1, where k=1, 2 etc., and the center-to-center distance p between the heads complies with the relationship p=n·W1, where n=2, 4, 6, ... etc.

By means of the measures in accordance with the invention it is achieved that the information can be read from and/or written on the track pattern in an even number of passes of the magnetic head unit relative to the medium and the position signal is immune to tolerances in the servotrack width and to amplitude differences between the first signal and the second signal. This immunity is achieved in that there are always at least two heads disposed on a boundary between two adjacent servotracks and in that these heads read a servotrack of the same one type by means of their facing parts and in that they read a servotrack of the other type by means of their parts which are remote from one another. The above-mentioned tolerances influence the signals read by means of these heads to the same extent, as a result of which these tolerances are cancelled in the actuator drive because this drive is based on the difference between the signals read by the relevant heads. If the apparatus is required to have a write capability, the heads are adapted to read servosignals and write information signals at the same time.

An embodiment of the system in accordance with the invention is characterized in that the medium has at least one servotrack having a width of at least n·W1. Owing to these measures one head can be disposed wholly on the n.W1 wide servotrack during all passes, thereby enabling this head to be used for reading a speed signal representative of the speed of the medium with respect to the magnetic head unit in the longitudinal direction. Owing to said measures the magnetic head unit need not be positioned accurately in the transverse direction in order to generate the speed signal. This simplifies starting of the system in accordance with the invention.

The medium in accordance with the invention is characterized in that the track pattern comprises a group of at least two bands of a first type separated by a band of a second type, which bands of the first type adjoin a servotrack at their sides remote from the band of the second type, which bands of the first type comprising N1 servotracks having a first typical width W1, the bands of the second type comprising N2 servotracks having a second typical width W2, which complies with N2=2, 4, 6 etc. and W2=(k+½)W1 or N2=1, 3, 5 etc. and W2=2k·W1, where k=1, 2 etc.

The medium in accordance with the invention can be used in the system in accordance with the invention with the advantages outlined above.

An embodiment of the medium in accordance with the invention is characterized in that N2=1 and k=1. By means of an apparatus comprising, for example, three heads disposed at a center-to-center distance of at least 2·W1 and having a recording width of approximately W1 this track pattern can be provided wholly with information tracks in an even number of passes. For example, if N1=1 this can be effected in two passes. The track pattern can be repeated several times in the transverse direction of the medium, as a result of which the magnetic head unit can inscribe a following track pattern with information after a displacement in the transverse direction. In a preferred embodiment N1=7, three of such track patterns are juxtaposed in the transverse direction and are spaced by a servotrack of 2·W1 width, and a band of the first type adjoins a servotrack having a width of 1.5·W1 adjacent a servotrack having a width of at least 9·W1. By means of an apparatus having eight heads disposed at a center-to-center distance of 8·W1 and a recording width of approximately W1 or less it is possible to write 64 information tracks over this track pattern in eight passes. An advantage of this embodiment is that each of the eight passes can be identified on the basis of the servosignals read by the heads. For example, in the first pass the signal of the second head is in phase with the signal of the first head and in the second, the third etc. through the eighth pass the signal of the second, the third etc. through the eighth head is in phase opposition to the signal of the first head. This makes it possible to preclude that the servosystem, for example after being subjected to an external mechanical shock, locks to another pass, where the apparatus continues writing.

An embodiment of the medium in accordance with the invention is characterized in that N2=2 and k=1. For example, if N1=3 it is possible to write in four passes twelve information tracks over this track pattern by means of an apparatus comprising three heads disposed at a center-to-center distance of 4W1 and having a recording width of approximately W1 or less.

Preferably, the above-mentioned embodiment is such that N1=11 and a band of the first type adjoins a servotrack having a width of 1.5·W1 and adjoining a servotrack having a width of at least 5·W1. With this preferred embodiment said track pattern can be inscribed with 32 information tracks in four passes by means of an apparatus comprising eight heads disposed at a center-to-center distance of 4W1 and having a recording width of approximately W1 or less. In the case of this preferred embodiment six heads are always disposed on a boundary between two adjacent servotracks, as a result of which six of the eight heads supply information about the position of the magnetic write head with respect to the track pattern. Since in this embodiment a large number of heads contribute to the generation of the position signal a high degree of robustness is achieved. This enables a satisfactory tracking to be obtained even if a part of the servotracks is unreadable. Two heads are always situated wholly on one servotrack, as a result of which these heads can supply information about the phase of the servosignal and the speed of the medium relative to the magnetic head unit. An advantage of this embodiment is that each of the four passes can be identified on the basis of the servosignals read by the heads. Thus, in the first pass the signal of the second head is in phase with the signal of the first head and in the second pass the signal of the second head is in phase opposition to the signal of the first head. In the third pass the signal of the fifth head is in phase opposition to the signal of the first head and in the fourth pass the signal of the fifth head is in phase with the signal of the first head. This makes it possible to preclude that the servosystem, for example after being subjected to an external mechanical shock, locks to another pass, where the apparatus continues writing.

An embodiment of the medium in accordance with the invention is characterized in that the first signal and the second signal each contain the same fundamental and the first signal and the second signal are in phase opposition to one another. By means of these measures it is achieved that the signal read by a head is zero if it is centered with respect to a boundary line between two servotracks. This is advantageous because, as a result of this, differences in sensitivity between the heads have substantially no influence on the generation of the position signal and because a measurement signal which varies about zero makes it possible to implement a servosystem which is accurate and highly insensitive to offsets in the control unit.

The invention is particularly advantageous if the medium is a tape-like medium wound on a reel hub and accommodated in a housing of a cassette. With such a cassette the position of the medium relative to an apparatus with which the cassette cooperates is generally inaccurate because a tape-like medium is slack and this position is also determined by the housing of the cassette. In addition, the dimensions of a tape-like medium in the transverse direction can vary owing to expansion or contraction as a result of the absorption of moisture or release of moisture by the medium. The measures in accordance with the invention yet ensure an accurate position of the magnetic head unit with respect to the medium, as a result of which high-density information storage is possible on the medium. Moreover, the medium in such a cassette is not fully protected against the ingress of dust and dirt from the environment and there is mechanical contact between the medium and the magnetic head unit, which may give rise to scratches. As a result of dust, dirt or scratches a part of the servosignals may be disturbed or completely unreadable at some locations. The measures in accordance with the invention mitigate the effect of dust, dirt and scratches on the tracking.

The magnetic write head and the arrangement in accordance with the invention are characterized in that the structure comprises a group of at least two bands of a first type, which are separated by a band of a second type, the bands of the first type adjoin a write gap at their sides remote from the band of the second type, the bands of the first type have N1 write gaps having a first typical width W1 and the band of the second type has N2 write gaps having a second typical width W2, which complies with N2=2, 4, 6 etc. and W2=(k+½)W1 or N2=1, 3, 5 etc. and W2=2k.W1, where k=1, 2 etc.

BRIEF DESCRIPTION OF THE DRAWINGS

The invention will be now be described in more detail, by way of example, with reference to the drawings, in which.

DETAILED DESCRIPTION OF THE PREFERRED EMBODIMENT

Figure 1:
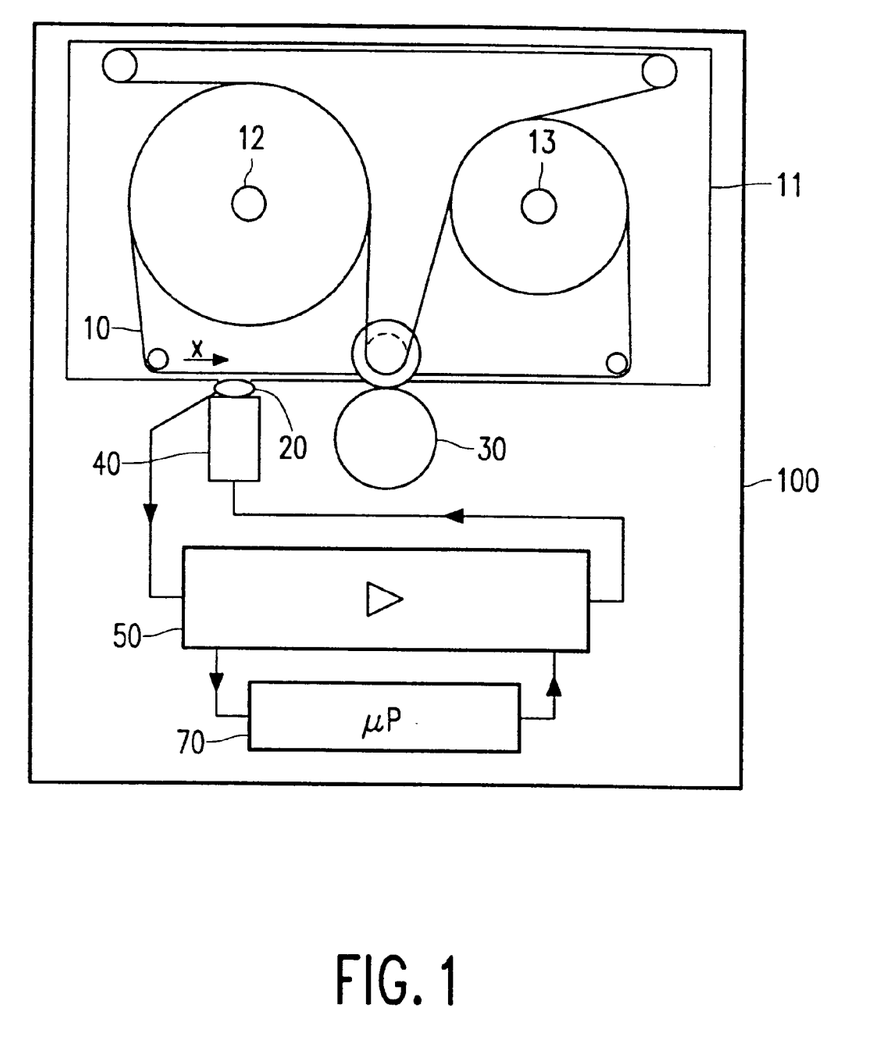
FIG. 1 shows diagrammatically the system in accordance with the invention.

FIG. 1 shows diagrammatically the system in accordance with the invention. The system includes an apparatus 100 and a magnetizable medium, in the present case a magnetic tape 10 accommodated in the housing of a cassette 11. The magnetic tape 10 has been provided with a pattern of servotracks in which servosignals are stored in the form of a magnetization pattern recorded at a deep level (see FIG. 2). These deep servotracks are referred to as buried servotracks. The apparatus 100 comprises a magnetic head unit 20 and means, in the present case a motor 30, for the relative movement of the magnetic tape 10 with respect to the magnetic head unit 20 in a longitudinal direction x along the servotracks (see FIG. 2). The apparatus 100 further comprises an actuator 40, for moving the magnetic head unit 20 transversely to the servotracks, and a servocircuit 50, arranged between the magnetic head unit 20 and the actuator 40. The apparatus 100 comprises control means, in the present case a microcomputer 70, for controlling the actuator 40 and the magnetic head unit 20.

Figure 2:
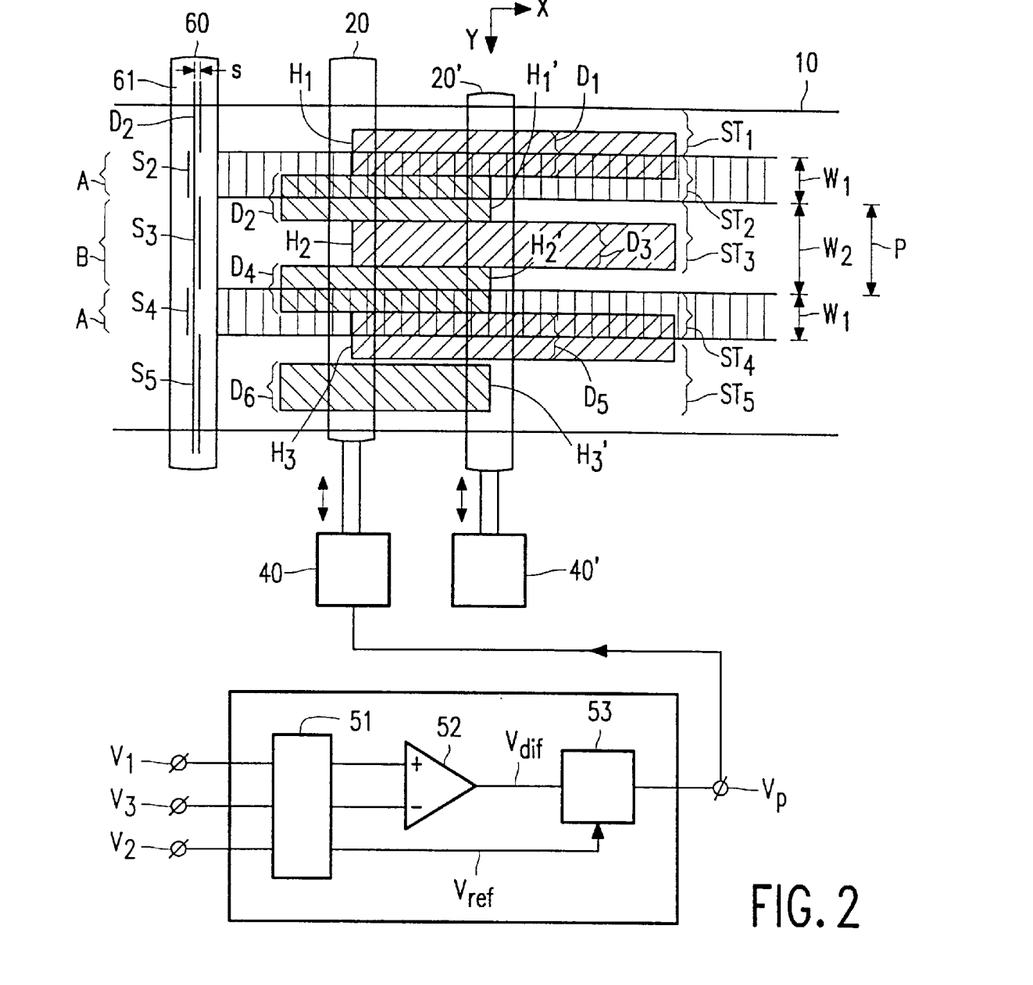
FIG. 2 shows a write head, a magnetic head unit, an actuator and a first embodiment of the medium in accordance with the invention.
Figure 3:
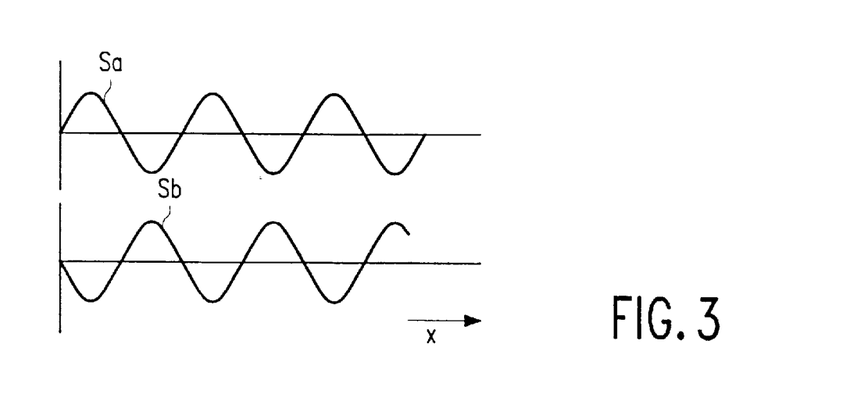
FIG. 3 shows two servosignals and their phase relationship to one another.

FIG. 2 shows diagrammatically a magnetizable medium in the form of the magnetic tape 10, a write head 60, the magnetic head unit 20 and the actuator 40. The magnetic tape 10 has been provided with a pattern of servotracks ST1–ST5 which extend in a longitudinal direction x and which adjoin one another in a transverse direction y which is perpendicular to the longitudinal x. The servotracks ST1, ST2 and ST5 are of a first type containing a servosignal Sa and the servotracks ST2 and ST4 are of a second type containing a servosignal Sb. The servosignals Sa and Sb each contain a fundamental of the same frequency but are in phase opposition to one another (see FIG. 3). The servosignals have been recorded by means of a write head 60 having a comparatively large gap length s. As a result of this, the servosignals are stored deep into the magnetic tape 10. The magnetic write head 60 has a head face 61 and a structure of integrated write units S1–S5, which structure terminates in the head face 61, which write units are disposed adjacent one another, extend substantially in the transverse direction and each have a write gap. The structure comprises a group of two write units S2 and S4 of a first type A, which are separated by a write unit S3 of a second type B. The write units S2 and S4 of the first type A have a first typical width W1 and the write unit S3 of the second type B has a second typical width W2=2·W1. By means of this write head 60 the track pattern ST1–ST5 is written onto the magnetic tape 10 in a single pass. This writing is preferably effected in an apparatus (see FIG. 7), specially designed for this purpose, when the magnetic tape is manufactured or when the magnetic tape 10 is loaded into the cassette 11.

The magnetic head unit 20 forms part of the apparatus 100 as shown in FIG. 1 and comprises three magnetic write heads H1, H2 and H3 capable of reading and writing simultaneously. The apparatus 100 as shown in FIG. 1 is adapted to write information signals in information tracks D1–D6. For positioning the magnetic head unit 20 during writing and/or reading of the information tracks D1–D6 the apparatus 100 comprises an actuator 40 and a servocircuit 50. The servocircuit 50 is arranged between the head 21 and the actuator 40 and is adapted to position the magnetic head unit 20 with respect to the track pattern ST1–ST5 in response to the servosignals V1, V2 and V3 read from the servotracks by the heads H1, H2 and H3, respectively. The servocircuit 50 comprises a selector 51 for selecting the signals received from heads which are disposed on a boundary line between two servotracks and a comparator 52 for generating a difference signal Vdif from the selected signals. The selector 51 is controlled by the microcomputer 70 shown in FIG. 1. The servocircuit 50 further comprises a multiplier 53 for generating a position signal Vp for driving the actuator 40, which position signal is obtained by multiplying the difference signal Vdif and a reference signal Vref obtained from the head which is disposed on one of the servotracks. The actuator 40 is driven until the position signal Vp is substantially equal to zero. Depending on the pass, the reference signal Vref and the difference signal Vdif are formed as follows by means of the selector 51:

| pass | Vref | Vdif |
| --- | --- | --- |
| 1 | V2 | V1 – V3 |
| 2 | V3 | V2 – V1 |

The center-to-center distance p between the magnetic write heads H1, H2 and H3 is equal to twice the typical width W1 of the servotracks ST2 and ST4. As a result, two passes are needed to provide the magnetic tape wholly with information tracks D1–D6. In the first pass the magnetic head unit 20 writes the information tracks D1, D3 and D5, the magnetic tape 10 being moved in the direction x relative to the magnetic head unit 20. In a second pass the same magnetic head unit, now referenced 20', writes the information tracks D2, D4 and D6 at another position in the transverse direction y, the magnetic tape 10 being moved in a direction opposite to the direction x relative to the magnetic head unit 20'. After these two passes the magnetic tape 10 has resumed its initial position.

Figure 4:
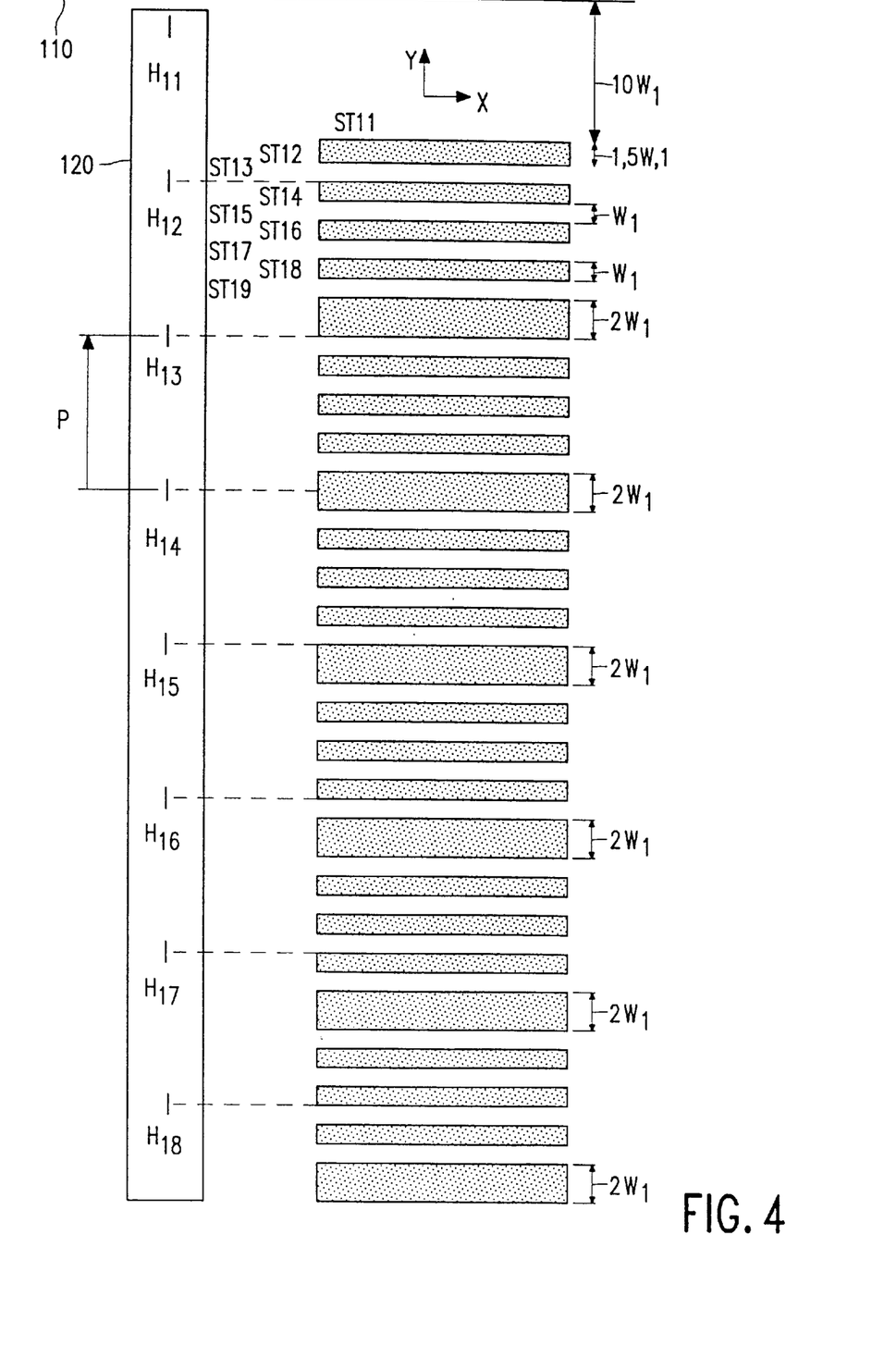
FIG. 4 shows diagrammatically a second embodiment of the medium in accordance with the invention.

FIG. 4 shows diagrammatically a second embodiment of the medium in accordance with the invention. The magnetic tape 110 has been provided with a pattern of servotracks which extend in a longitudinal direction x. The non-shaded servotracks contain a servosignal Sa and the shaded servotracks contain a servosignal Sb. The servosignals Sa and Sb each contain a fundamental of the same frequency but are in phase opposition to one another (see FIG. 3). The servosignals have been recorded by means of a write head, not shown, as described with reference to FIG. 2. The magnetic tape 110 is adapted to cooperate with an apparatus comprising a magnetic head unit 120 having eight heads H11–H18. The center-to-center distance p between the magnetic write heads H11–H18 is equal to eight times the typical width W1. As a result, eight passes are needed to provide the whole magnetic tape 110 with information tracks in a manner comparable to that described with reference to FIG. 2. After these eight passes the magnetic tape 110 has again reached its initial position. Depending on the pass, the reference signal Vref and the difference signal Vdif are formed as follows by the selector 51:

| pass | Vref       | Vdif                                    |
|------|------------|-----------------------------------------|
| 1    | H11 + H12  | H13 – H14 + H15 – H16 + H17 – H18       |
| 2    | H11 – H12  | –H13 + H14 – H15 + H16 – H17 + H18      |
| 3    | H11 – H13  | H12 – H14 + H15 – H16 + H17 – H18       |
| 4    | H11 – H14  | –H12 + H13 – H15 + H16 – H17 + H18      |
| 5    | H11 – H15  | H12 – H13 + H14 – H16 + H17 – H18       |
| 6    | H11 – H16  | –H12 + H13 – H14 + H15 – H17 + H18      |
| 7    | H11 – H17  | H12 – H13 + H14 – H15 + H16 – H18       |
| 8    | H11 – H18  | –H12 + H13 – H14 + H15 – H16 + H17      |

Figure 5:
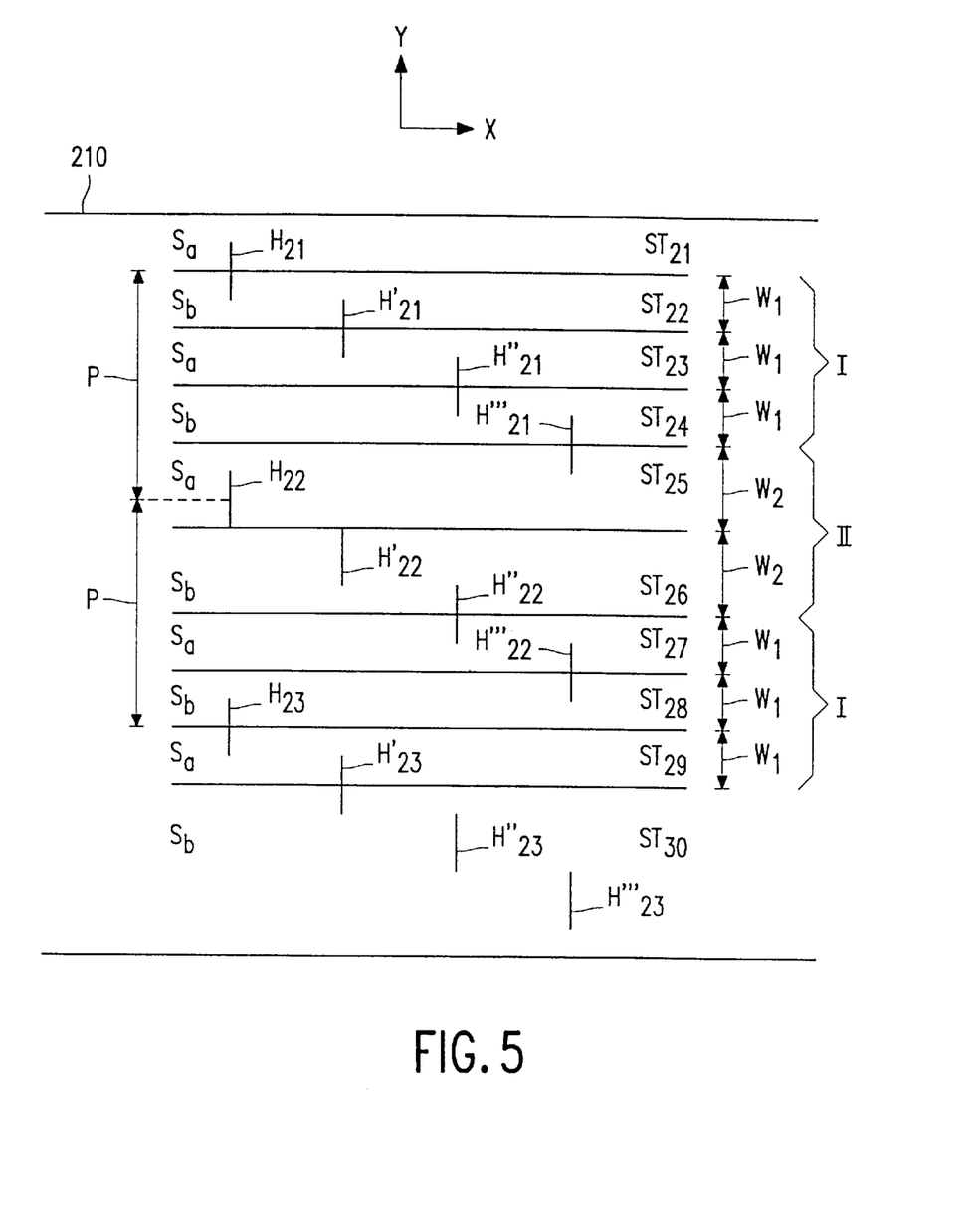
FIG. 5 shows diagrammatically a third embodiment of the medium in accordance with the invention.

FIG. 5 shows diagrammatically a third embodiment of the medium accordance with the invention. The magnetic tape 210 has been provided with a pattern of servotracks ST21–ST30 which extend in a longitudinal direction x. The odd-numbered servotracks contain a servosignal Sa and the even-numbered servotracks contain a servosignal Sb. The servosignals Sa and Sb each contain a fundamental of the same frequency but are in phase opposition to one another (see FIG. 3). The servosignals have been recorded by means of a write head, not shown, as described with reference to FIG. 2. The servotracks ST22, ST23, ST24 and ST27, ST28, ST29 have a typical width W1 and form a group of two bands separated by a band with the servotracks ST25 and ST26 having a typical width of W2=1.5·W1. The magnetic tape 210 is adapted to cooperate with an apparatus comprising magnetic write heads H21, H22 and H23. The center-to-center distance p between the magnetic write heads H21, H22 and H23 is equal to four times the typical width W1. As a result, four passes are needed to provide the whole magnetic tape 210 with information tracks in a manner comparable to that described with reference to FIG. 2. After these four passes the magnetic tape 110 has resumed its initial position.

Figure 6:
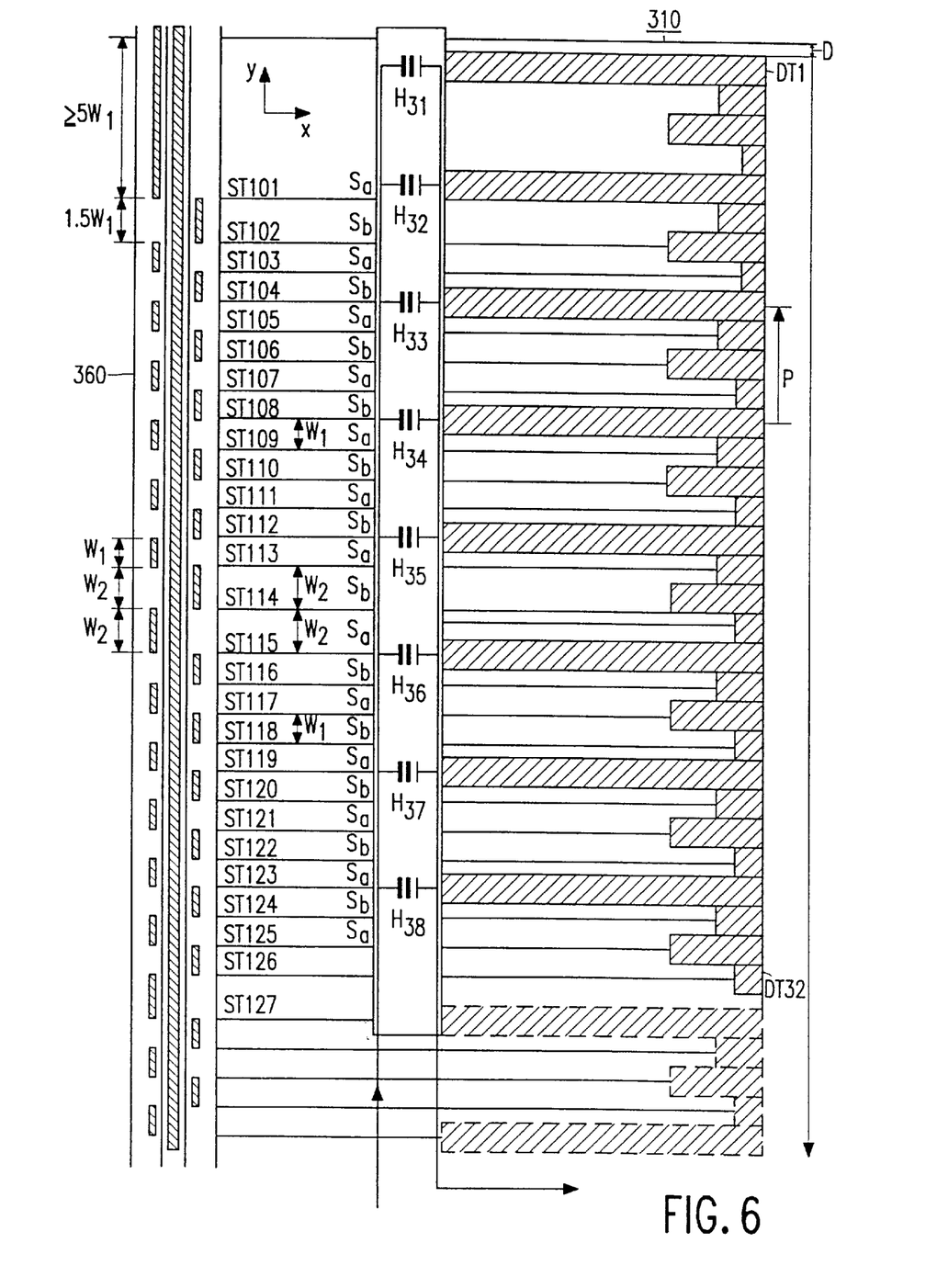
FIG. 6 shows diagrammatically a part of a fourth embodiment of the medium in accordance with the invention and a part of a write head for writing the servotracks.

FIG. 6 shows diagrammatically a part of a fourth embodiment of the medium in accordance with the invention and a part of a write head for writing the servotracks. By means of the write head 360 the magnetic tape 310 has been provided with a pattern of servotracks ST101–ST127 which extend in a longitudinal direction x. The odd-numbered servotracks contain a servosignal Sa and the even-numbered servotracks contain a servosignal Sb. The servosignals Sa and Sb each contain a fundamental of the same frequency but are in phase opposition to one another (see FIG. 3). The servotracks ST103–ST113 and ST116–ST126 have a typical width W1 and form a group of two bands separated by a band with the servotracks ST114 and ST115 having a typical width of W2=1.5·W1. The magnetic tape 310 is adapted to cooperate with an apparatus comprising magnetic write heads H31–H38. The center-to-center distance p between the magnetic write heads H31–H38 is equal to four times the typical width W1. As a result, four passes are needed to provide the track pattern ST101–ST127 wholly with information tracks DT1–DT32 in a manner comparable to that described with reference to FIG. 2. After these four passes the magnetic tape 310 has resumed its initial position. Depending on the pass, the reference signal Vref and the difference signal Vdif are formed as follows by the selector 51:

| pass | Vref      | Vdif                                    |
|------|-----------|-----------------------------------------|
| 1    | H31 + H32 | (H33 + H34 + H35) – (H36 + H37 + H38)   |
| 2    | H31 – H32 | (H33 + H34 + H35) – (H36 + H37 + H38)   |
| 3    | H31 – H35 | (H32 + H33 + H34) – (H36 + H37 + H38)   |
| 4    | H31 + H35 | (H32 + H33 + H34) – (H36 + H37 + H38)   |

Figure 7:
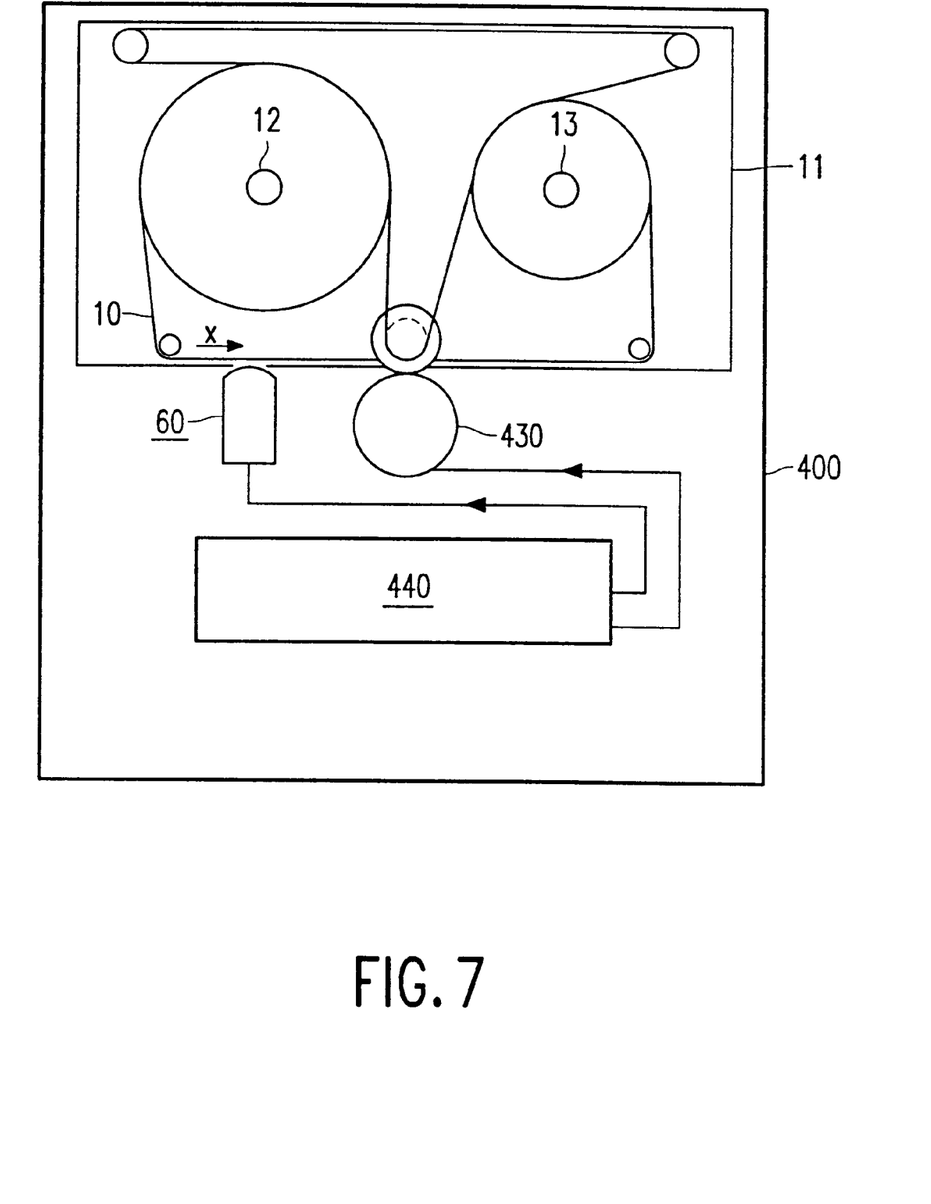
FIG. 7 shows diagrammatically an arrangement according to the invention.

FIG. 7 shows an embodiment of the arrangement according to the invention. The arrangement 400 comprises a space for accommodating a cassette 11. The cassette 11 has two reel heels 12 and 13 on which a magnetic tape 10 is wound. The arrangement 400 further comprises a write head 60 and a motor 430 for moving the magnetic tape 10 along the write head 60 so that the tape 10 can be scanned. The arrangement 100 further comprises control electronics 440 for driving the write head 60 and the motor 430. With this arrangement a magnetic tape 10 can be provided with servo tracks as explained with reference to FIG. 2.

It is to be noted that the invention is not limited to the embodiments disclosed herein. Various other embodiments are possible with the scope of the invention. It is possible, for example, to use a magnetic disc instead of a magnetic tape. Besides, the servosignals Sa and Sb can be signals of different frequency, the servocircuit generating a position signal for controlling the actuator in dependence on the amplitude of the servosignals Sa and Sb as read by a number of heads.

What is claimed is:

1. A system for recording and/or reproducing information, comprising a magnetizable medium provided with a track pattern comprising
buried servotracks of a first type containing a signal, and
buried servotracks of a second type containing a second signal,
which servotracks extend substantially in a longitudinal direction and which track pattern, in a transverse direction perpendicular to the longitudinal direction, alternately comprises a servotrack of the first type followed by a servotrack of the second type, and an apparatus comprising
a magnetic head unit comparing a plurality of heads at different positions in the transverse direction,
means for moving the medium relative to the magnetic head unit in the longitudinal direction, and
an actuator for moving the magnetic head unit relative to the medium in the transverse direction, and
a control unit for controlling the actuator, which control unit is adapted to generate a position signal based on the difference between the signals of two heads,
characterized in that
the track pattern comprises a group of at least two bands of a first type separated by a band of a second type, which bands of the first type adjoin a servotrack at their sides remote from the band of the second type, the bands of the first type comprising N1 servotracks having a first typical width W1, the bands of the second type comprising N2 servotracks having a second typical width W2 which complies with N2=an even number and W2=(k+½)W1

N2=an odd number and W2=2k.W1, where k=an integer, and the center-to-center distance p between the heads complies with the relationship p=n·W1, where n=even number.

2. A system for recording and/or reproducing information, as claimed in claim 1, characterized in that the medium has at least one servotrack having a width of at least n·W1.

3. A magnetizable medium provided with a track pattern comprising buried servotracks of a first type containing a signal, and buried servotracks of a second type containing a second signal, which servotracks extend substantially in a longitudinal direction and which track pattern, in a transverse direction perpendicular to the longitudinal direction, alternately comprises a servotrack of the first type followed by a servotrack of the second type, characterized in that the track pattern comprises a group of at least two bands of a first type separated by a band of a second type, which bands of the first type adjoin a servotrack at their sides remote from the band of the second type, which bands of the first type comprising N1 servotracks having a first typical width W1, the bands of the second type comprising N2 servotracks having a second typical width W2, which complies with N2=an even integer and W2=(k+½)W1

N2=an odd integer and W2=2k.W1, where k=an integer.

4. A magnetizable medium as claimed in claim 3, characterized in that N2=1 and k=1.

5. A magnetizable medium as claimed in claim 4, characterized in that N1=7 and three of such track patterns are juxtaposed in the transverse direction and are separated by a servotrack of 2·W1 width, and a band of the first type adjoins a servotrack having a width of 1.5·W1 and adjoining a servotrack having a width of at least 9·W1.

6. A magnetizable medium as claimed in claim 5, characterized in that the first signal and the second signal each contain the same fundamental and the first signal and the second signal are in phase opposition to one another.

7. A magnetizable medium as claimed in claim 4, characterized in that the first signal and the second signal each contain the same fundamental and the first signal and the second signal are in phase opposition to one another.

8. A magnetizable medium as claimed in claim 3, characterized in that N2=2 and k=1.

9. A magnetizable medium as claimed in claim 8, characterized in that N1=11 and a band of the first type adjoins a servotrack having a width of 1.5·W1 and adjoining a servotrack having a width of at least 5·W1.

10. A magnetizable medium as claimed in claim 9, characterized in that the first signal and the second signal each contain the same fundamental and the first signal and the second signal are in phase opposition to one another.

11. A magnetizable medium as claimed in claim 8, characterized in that the first signal and the second signal each contain the same fundamental and the first signal and the second signal are in phase opposition to one another.

12. A magnetizable medium as claimed in claim 3, characterized in that the first signal and the second signal each contain the same fundamental and the first signal and the second signal are in phase opposition to one another.

13. A cassette having a housing which accommodates at least one reel hub onto which a tape-like magnetizable medium has been wound, which medium is provided with a track pattern comprising buried servotracks of a first type containing a signal, and buried servotracks of a second type containing a second signal, which servotracks extend substantially in a longitudinal direction and which track pattern, in a transverse direction perpendicular to the longitudinal direction, alternately comprises a servotrack of the first type followed by a servotrack of the second type, characterized in that the track pattern comprises a group of at least two bands of a first type separated by a band of a second type, which bands of the first type adjoin a servotrack at their sides remote from the band of the second type, which bands of the first type comprising N1 servotracks having a first typical width W1, the bands of the second type comprising N2 servotracks having a second typical width W2, which complies with N2=an even number and W2=(k+½)W1

N2=an odd number and W2=2k.W1, where k=an integer.

14. A cassette as claimed in claim 13, characterized in that N2=1 and k=1.

15. A cassette as claimed in claim 13, characterized in that N1=7 and three of such track patterns are juxtaposed in the transverse direction and are separated by a servotrack of 2·W1 width, and a band of the first type adjoins a servotrack having a width of 1.5·W1 and adjoining a servotrack having a width of at least 9·W1.

16. A cassette as claimed in claim 13, characterized in that N2=2 and k=1.

17. A cassette as claimed in claim 13, characterized in that N1=11 and a band of the first type adjoins a servotrack having a width of 1.5·W1 and adjoining a servotrack having a width of at least 5·W1.

18. A cassette as claimed in claim 13, characterized in that the first signal and the second signal each contain the same fundamental and the first signal and the second signal are in phase opposition to one another.

* * * * *